Patented June 5, 1951

2,555,364

UNITED STATES PATENT OFFICE 2,555,364

SUBTILIN-PECTIN DERIVATIVE

Harry S. Owens and William D. Maclay, Berkeley, Calif., assignors to the United States of America as represented by the Secretary of Agriculture No Drawing. Application June 10, 1949,
Serial No. 98,401

4 Claims. (Cl. 167—65)

(Granted under the act of March 3, 1883, as
amended April 30, 1928; 370 O. G. 757)

This application is made under the act of March 3, 1883, as amended by the act of April 30, 1928, and the invention herein described if patented in any country, may be manufactured and used by or for the Government of the United States of America for governmental purposes throughout the world without the payment to us of any royalty thereon.

This invention relates to the preparation of novel compositions of matter derived from subtilin and pectin.

In accordance with this invention subtilin is reacted with pectin to produce derivatives having enhanced solubility.

One of the objects of this invention is the provision of novel compositions of matter derived from subtilin and pectin. Another object of this invention lies in the provision of processes for preparing such compositions of matter. Further objects will be apparent from the description herein.

Subtilin is an antibiotic produced by a particular strain of *Bacillus subtilis* and has antibiotic activity against a number of pathogenic organisms including *Bacillus anthracis*, *Diplococcus pneumoniae*, *Neisseria gonorrheae*, *Mycobacterium tuberculosis*, and *Endamoeba hystolytica*. The preparation of subtilin is disclosed by Dimick et al. in U. S. Patent No. 2,459,139, January 18, 1949. Subtilin is useful in food preservation.

Unfortunately, subtilin has a low solubility in water in the presence of inorganic salts. In experimental determinations of antibiotic effectiveness on animals it cannot be effectively applied by parenteral administration—it being soluble only to the extent of about 0.1% in blood. It has now been found that derivatives of subtilin with pectin are much more soluble than subtilin itself, being at least 50 times as soluble as subtilin and thus are adapted for experimental parenteral administration.

The subtilin-pectin derivatives of this invention are formed by contacting subtilin with pectin. It is not known for sure whether the derivatives are chemical or physical combinations. One possibility is that they are chemical combinations—salts—formed by the chemical union of the amino groups in the subtilin molecule with the carboxyl groups in the pectin molecule. On the other hand, they may be formed by physical adsorption of the subtilin on the pectin molecule. Since the exact nature of the forces uniting the individual reactants has not been ascertained, the derivatives are herein designated as subtilin-pectin complexes. Regardless of the theory of the union between the reactants, the resulting derivative or complex has properties distinct from those of its components and is a new and useful material.

The products of this invention can be prepared very simply by suitable contact between the subtilin and the pectin. For practical purposes it is best to conduct the reaction in aqueous solution so that proper contact between the reactants will be insured. The most suitable method is to separately dissolve the subtilin and the pectin in water and then to mix the two solutions, preferably by pouring the subtilin solution into the pectin solution while agitating the latter. In this manner rapid reaction is obtained and the possibility of the pectin forming slowly-reacting clumps is avoided. The resulting aqueous solution of the subtilin-pectin complex can be used directly in this form. Of course, if the solution is to be used for the experimental intravenous injection, the reactants should first be sterilized, likewise the water used for solution, or the finished solution can be sterilized. If the dry product is desired, it may be isolated in several ways. One method is to freeze the entire reaction mixture and remove the water by applying a vacuum while keeping the mass frozen. This process (lyophilization) yields the product as a porous structure which is readily soluble in water. Another method is to add a water-miscible organic solvent to the reaction mixture to precipitate the product. The precipitate can then be washed with further amounts of the solvent and dried in vacuum. Suitable solvents are methanol, ethanol, propanol, isopropanol, tertiary butanol, acetone, dioxane, or other inert, neutral, water-miscible organic solvents.

The proportion of subtilin to pectin can be varied over a considerable range to obtain complexes of different solubilities. For practical purposes at least 5 parts of pectin are employed per part of subtilin. The ratio of pectin can be increased greatly above this point to obtain increasingly soluble salts with the only limitation that above about 15 parts pectin to one part subtilin the complex forms solutions which are too viscous for practical purposes. This disadvantage of forming viscous solutions can be overcome, at least in part, by using a degraded pectin in the process. By a degraded pectin is meant a pectin which has been subjected to heat or other treatment to reduce its molecular weight as well known in the art. Degraded pectins having an intrinsic viscosity of from about 1 to about 2 deciliters per gram are particularly suitable.

The following examples illustrate procedures within the scope of this invention, but are not to be taken as a limitation of the scope of this invention to these particular procedures.

*Example I*

30 grams of degraded pectin (intrinsic viscosity 1.2 deciliters per gram) was dissolved in 350 ml. of water. Five grams of subtilin was dissolved in 100 ml. of water. The two solutions were mixed thoroughly and allowed to stand for a few minutes. Two volumes of acetone were then added and the precipitated subtilin-pectin complex was filtered off, washed with acetone and dried under vacuum. The product was obtained as a white powder in a yield of 34 grams. The product readily formed a 5% solution in 0.85% aqueous sodium chloride at a pH of 7.3 to 7.4 and a temperature of 35° C. (approximate physiological condition of blood). Under these conditions subtilin had a solubility of only 0.096%. A bioassay carried out to determine the antibiotic value of the product. It was determined that the subtilin-pectin complex had an activity (based on the subtilin content thereof) against *Micrococcus conglomeratus* of 0.75 on a relative basis giving subtilin, itself, an arbitrary activity of 1.

*Example II*

A solution of 200 mg. of subtilin in 20 ml. water was added to a solution of 1 g. of pectin (pharmaceutical grade, N. F. VIII) in 60 ml. water while stirring the pectin solution. The resulting dispersion was then frozen and subjected to vacuum until substantially dry then further subjected to vacuum at a temperature of 65° C. until completely dry. 1.2 g. of the subtilin-pectin complex was obtained as a white powder, having an activity (based on the subtilin content thereof) of 75% that of the subtilin used as the starting material.

Since the products of this invention contain subtilin and exhibit the antibiotic action thereof, they may be used in experimental determinations of antibiotic effectiveness on animals.

Having thus described our invention, we claim:

1. A water-soluble complex of subtilin and pectin in which the pectin is in the proportion of about 5 to 15 parts of pectin to 1 part of subtilin, being at least about 50 times as water-soluble as subtilin.

2. A process for preparing a complex of subtilin and pectin having a water-solubility at least about 50 times that of subtilin comprising adding an aqueous solution of subtilin to an aqueous solution of pectin, in the proportion of about 5 to 15 parts of pectin to 1 part of subtilin, and isolating a dry porous product by lyophilization.

3. A process for preparing a complex of subtilin and pectin having a water-solubility at least about 50 times that of subtilin comprising adding an aqueous solution of subtilin to an aqueous solution of pectin, in the proportion of about 5 to 15 parts of pectin to 1 part of subtilin, precipitating the product with a water-miscible organic solvent and drying it.

4. A composition of matter in accordance with claim 1 wherein the pectin is a degraded pectin having an intrinsic viscosity from about 1 to 2 deciliters per gram.

HARRY S. OWENS.
WILLIAM D. MACLAY.

REFERENCES CITED

The following references are of record in the file of this patent:

UNITED STATES PATENTS

| Number | Name | Date |
|---|---|---|
| 2,294,016 | Brahn | Aug. 25, 1942 |
| 2,481,804 | Whittingham | Sept. 13, 1949 |
| 2,491,537 | Welch | Dec. 20, 1949 |

OTHER REFERENCES

Science News Letter, Oct. 4, 1947, page 210.